(12) United States Patent
Starr et al.

(10) Patent No.: US 9,192,266 B2
(45) Date of Patent: *Nov. 24, 2015

(54) MOVABLE SUPPORT DEVICE

(71) Applicant: WILTON INDUSTRIES, INC., Woodridge, IL (US)

(72) Inventors: David Starr, Woodridge, IL (US); Kevin McFadden, Channahon, IL (US); Jeffrey Chiu, Woodridge, IL (US); Erin Smith, Chicago, IL (US); Sarah Mault, Woodridge, IL (US)

(73) Assignee: Wilton Industries, Inc., Woodridge, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/155,119

(22) Filed: Jan. 14, 2014

(65) Prior Publication Data

US 2014/0183322 A1 Jul. 3, 2014

Related U.S. Application Data

(63) Continuation-in-part of application No. 13/041,271, filed on Mar. 4, 2011, now Pat. No. 8,641,060.

(51) Int. Cl.
| | |
|---|---|
| *A47F 3/14* | (2006.01) |
| *A47J 47/16* | (2006.01) |
| *F16M 11/42* | (2006.01) |
| *A47B 88/04* | (2006.01) |
| *A47B 77/18* | (2006.01) |

(52) U.S. Cl.
CPC .............. *A47J 47/16* (2013.01); *F16M 11/42* (2013.01); *A47B 77/18* (2013.01); *A47B 88/04* (2013.01); *A47B 2200/0038* (2013.01)

(58) Field of Classification Search
CPC . A47J 47/16; A47B 77/18; A47B 2200/0038; B60N 2/28
USPC ................ 280/2, 37, 43, 43.11, 43.12, 43.13, 280/43.14, 47.34, 79.11, 79.3; 211/13.1, 211/133.6; 312/137; 248/129, 519, 159, 248/188.2; 473/479
See application file for complete search history.

(56) References Cited

U.S. PATENT DOCUMENTS

| | | | | | |
|---|---|---|---|---|---|
| 1,063,620 | A | * | 6/1913 | Thornley | ......................... 482/25 |
| 1,200,364 | A | * | 10/1916 | Kane | ............................. 248/129 |
| 1,355,173 | A | * | 10/1920 | Shadel et al. | ................... 296/13 |
| 1,956,245 | A | * | 4/1934 | Moorman et al. | ......... 280/43.11 |
| 2,374,982 | A | * | 5/1945 | Davies | .......................... 414/537 |

(Continued)

OTHER PUBLICATIONS

Pull Out Coffee Maker Caddy (Item #32920), "Handy Caddy", 2 pages.

(Continued)

*Primary Examiner* — Brodie Follman
(74) *Attorney, Agent, or Firm* — Foley & Lardner LLP (57) ABSTRACT

A support device for moving an item on a surface. A main body includes a panel and a sidewall. A handle assembly engages the main body and includes a first transportation mechanism. The support device includes a resistance portion on the main body for engaging a surface and resisting movement of the support device when in a resistive mode. The handle mechanism lowers the first transportation mechanism to engage the surface and disengage the resistance portion from the surface in a transportive mode to encourage movement of the support device and the item supported thereon.

20 Claims, 11 Drawing Sheets

(56) References Cited

U.S. PATENT DOCUMENTS

| | | | |
|---|---|---|---|
| D159,960 S | 9/1950 | Davey | |
| 2,744,710 A * | 5/1956 | Gerosa | 248/129 |
| 2,823,924 A * | 2/1958 | Carmichael | 280/43.14 |
| 3,178,197 A | 4/1965 | Boatner | |
| 3,179,438 A * | 4/1965 | Field | 280/43.14 |
| 3,352,568 A * | 11/1967 | Ahlf | 280/35 |
| 3,404,884 A | 10/1968 | Sorenson et al. | |
| D263,820 S | 4/1982 | Levenberg | |
| 4,378,191 A * | 3/1983 | Sato | 414/540 |
| 4,417,738 A * | 11/1983 | Kendall | 280/43.17 |
| 4,874,182 A * | 10/1989 | Clark | 280/30 |
| 4,889,352 A | 12/1989 | Chamberlin, Jr. et al. | |
| 4,902,026 A * | 2/1990 | Maldonado | 280/30 |
| D327,351 S | 6/1992 | Dallas | |
| 5,127,720 A | 7/1992 | Shultz | |
| D333,899 S | 3/1993 | Caceres | |
| 5,299,826 A * | 4/1994 | Flowers | 280/651 |
| 5,542,346 A * | 8/1996 | Shenk | 99/400 |
| D375,658 S | 11/1996 | Reichert | |
| D379,701 S | 6/1997 | Copeland, Sr. | |
| D393,386 S | 4/1998 | Pasalich | |
| 5,769,436 A * | 6/1998 | Andrey | 280/47.17 |
| 5,893,571 A | 4/1999 | Nowell | |
| D435,989 S | 1/2001 | Hunt | |
| 6,216,994 B1 * | 4/2001 | Yeh | 248/346.06 |
| 6,240,830 B1 | 6/2001 | Goldston | |
| 6,367,748 B1 * | 4/2002 | Solomon et al. | 248/129 |
| D457,364 S | 5/2002 | Shea | |
| 6,386,560 B2 * | 5/2002 | Calender | 280/47.34 |
| 6,405,989 B2 * | 6/2002 | Davis et al. | 248/519 |
| 6,405,990 B2 * | 6/2002 | Davis et al. | 248/519 |
| 6,410,068 B2 | 6/2002 | Goldston | |
| 6,412,746 B2 * | 7/2002 | Davis et al. | 248/519 |
| 6,412,747 B2 * | 7/2002 | Davis et al. | 248/519 |
| 6,427,963 B1 * | 8/2002 | Davis et al. | 248/519 |
| 6,470,793 B1 * | 10/2002 | Vogt | 99/279 |
| D467,098 S | 12/2002 | Linz | |
| 6,554,243 B2 * | 4/2003 | Davis et al. | 248/519 |
| 6,607,199 B2 | 8/2003 | Gruber | |
| 6,656,065 B2 * | 12/2003 | Nye | 473/481 |
| D485,700 S | 1/2004 | Roseman | |
| 6,691,961 B2 * | 2/2004 | Solomon et al. | 248/129 |
| 6,857,642 B2 | 2/2005 | Gruber | |
| D506,588 S | 6/2005 | Babkes et al. | |
| 7,051,853 B2 * | 5/2006 | Brown | 190/18 A |
| 7,104,553 B2 | 9/2006 | Gruber | |
| 7,137,603 B2 * | 11/2006 | Solomon et al. | 248/129 |
| D538,988 S | 3/2007 | Jordan, Jr. | |
| D589,287 S | 3/2009 | Welsch et al. | |
| D592,897 S | 5/2009 | Welsch et al. | |
| D593,347 S | 6/2009 | Kilpatrick | |
| D594,622 S | 6/2009 | Kissun | |
| 7,568,667 B1 * | 8/2009 | Feik et al. | 248/129 |
| 7,770,903 B2 * | 8/2010 | Konstant | 280/33.997 |
| 8,109,525 B2 * | 2/2012 | Salus | 280/43 |
| 8,292,309 B2 * | 10/2012 | Fan et al. | 280/43.14 |
| 8,632,045 B2 * | 1/2014 | Ma | 248/519 |
| 8,641,060 B2 * | 2/2014 | Starr et al. | 280/79.5 |
| 8,657,246 B2 * | 2/2014 | Ma | 248/346.01 |
| 2001/0035480 A1 * | 11/2001 | Davis et al. | 248/129 |
| 2001/0035481 A1 * | 11/2001 | Davis et al. | 248/129 |
| 2001/0035485 A1 * | 11/2001 | Davis et al. | 248/346.2 |
| 2004/0055913 A1 | 3/2004 | Berry | |
| 2005/0150395 A1 | 7/2005 | Olekaibe et al. | |
| 2006/0065126 A1 | 3/2006 | Turi | |
| 2006/0237026 A1 | 10/2006 | Simester | |
| 2008/0074020 A1 | 3/2008 | Doubts | |
| 2008/0251472 A1 * | 10/2008 | Kasden et al. | 211/41.2 |
| 2009/0020017 A1 | 1/2009 | Lin et al. | |
| 2009/0064450 A1 | 3/2009 | Newton et al. | |
| 2009/0230647 A1 * | 9/2009 | Taguchi | 280/79.3 |
| 2011/0095497 A1 * | 4/2011 | Fan et al. | 280/43.14 |
| 2012/0024329 A1 * | 2/2012 | Ma | 135/16 |
| 2012/0025050 A1 * | 2/2012 | Ma | 248/346.01 |
| 2012/0186950 A1 * | 7/2012 | Ishino et al. | 198/850 |
| 2012/0223040 A1 * | 9/2012 | Starr et al. | 211/133.6 |

OTHER PUBLICATIONS

Office Action for U.S. Appl. No. 13/041,271 dated Jun. 20, 2013, 10 pages.

Notice of Allowance for U.S. Appl. No. 13/041,271 dated Sep. 27, 2013, 15 pages.

* cited by examiner

MOVABLE SUPPORT DEVICE

CROSS-RELATED APPLICATIONS

This application is a Continuation-in-part of U.S. application Ser. No. 13/041,271 filed Mar. 4, 2011, hereby incorporated by reference in its entirety.

FIELD OF THE INVENTION

The present invention relates generally to the field of movable support devices.

BACKGROUND OF THE INVENTION

Space in modern kitchens has become a precious commodity as more and more small appliances and gadgets are available to the consumer. Many such appliances have become a part of the everyday routine for their owners. For example, coffee makers may be a vital part of a user's morning routine. Thus, the placement of the appliance on a work surface, such a countertop, to provide ease of access is important. Due to the finite amount of countertop space, it is generally desirable to minimize the amount of space used by the appliance.

In addition, the placement of an appliance on a countertop can cause problems with the use of the appliance. For example, due to the depth and/or height of the countertop, the appliance may be located a distance from a user that renders operation inconvenient or difficult. Further, in most kitchens much of the countertop is positioned below wall-mounted storage cabinets. Certain appliances may be of such a construction that they cannot be operated when positioned underneath the storage cabinets. For example, a cartridge-based single serving coffee machine may require access to the top of the machine with sufficient clearance to insert and remove the single serve cartridge. Similarly, the water reservoirs of traditional drip-style coffee makers are typically filled through an opening in the top of the maker, which typically requires sufficient clearance for the user to pour the contents of a carafe into the reservoir.

While a user may drag the appliance out from under the wall-mounted cabinets to create sufficient clear to prepare the machine for operation, that is often undesirable or unsafe because the appliance may not be readily or easily movable or may contain hot water or surfaces.

SUMMARY OF THE INVENTION

A support device comprising a main body. The main body has a panel and a sidewall extending therefrom, the main body further having a resistance portion adapted to provide resistance to movement in at least one direction when in contact with a surface. A handle assembly is partially disposed within the main body. The handle assembly comprises a lever and a first transportation mechanism. The lever has a first portion substantially interior to the main body and hingedly attached to the main body and a second portion substantially exterior to the main body. The first transportation mechanism is connected to the handle assembly and movable relative to the main body and the surface. The resistive portion of the main body is in contact with the surface in a resistive mode and movement of the handle assembly to pivot away from the panel engages the first transportation mechanism with the surface and moving at least a portion of the resistance portion away from the surface in a transportive mode.

A support device comprising a main body. The main body has a panel and a sidewall extending downward from the periphery of the panel. The sidewall includes a bottom surface having a resistance portion for engaging a surface to resist movement of the support device. A handle assembly is hingedly attached at a first end to a bottom surface of the panel and extends through a void in the sidewall. The handle assembly has a first transportation mechanism attached to the handle assembly between the hinged attachment and the void. The handle assembly is movable within the void to rotate relative to the main body between a first position and a second position. When the handle assembly is in the first position, the first transportation mechanism is disposed within main body and when the handle assembly is in the second position, the first transportation mechanism is at least partial outside of the main body, such that the first transportation mechanism extends below a plane defined by the bottom surface of the sidewall.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and the various ways in which it may be practiced. In the drawings:

FIGS. 3A-C illustrate an embodiment of the movable support device in the resistive mode.

FIGS. 4A-C illustrate an embodiment of the movable support device in the transportive mode.

DETAILED DESCRIPTION OF THE PREFERRED EMBODIMENTS

The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals represent similar parts throughout the several views of the drawings.

A movable support device 100 is described herein. The movable support device 100 is a movable platform that may be used to support items such as small appliances and transport them back and forth, such as from under wall mounted cabinets so that the transported item can be accessed. For example, in the case of coffee makers that need to be filled from the top with water, the movable support device 100 may be utilized to transport the coffee maker out from under a kitchen upper cabinet overhanging the countertop to access the filling door of the coffee maker.

Figure 1:
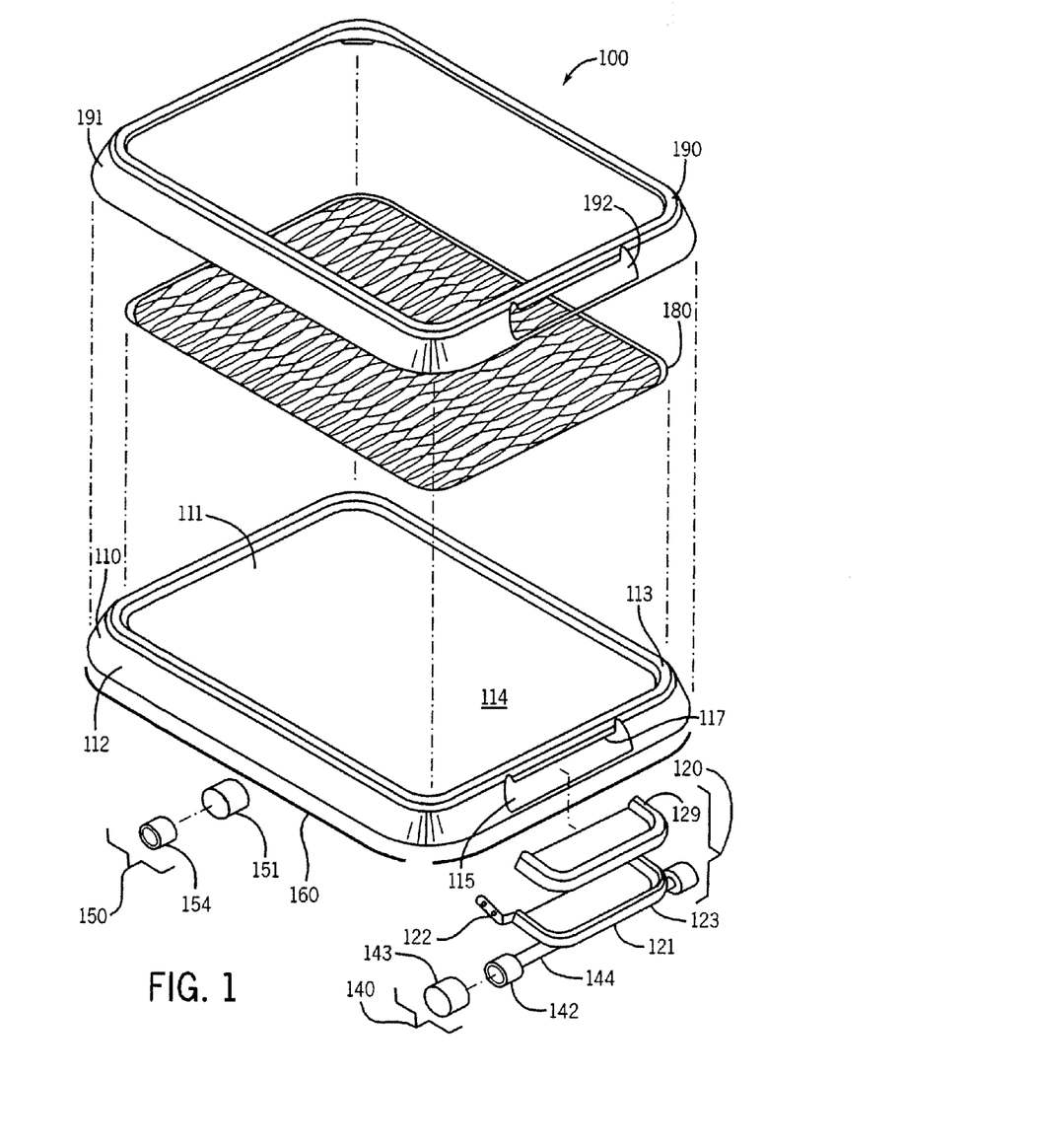
FIG. 1 is an exploded perspective view of one embodiment of a movable support device.

Referring to FIG. 1, an exploded view is provided of one embodiment of a movable support device. The movable support device 100 includes a main body 110. The main body 110 includes a panel 111 and a sidewall 112. In one embodiment, the sidewall 112 extends from the panel 111 and includes a void 115 adapted to receive at least a portion of a handle assembly 120.

The handle assembly 120 includes a lever 121 and a first transportation mechanism 140. The lever 121 is hinged with respect to the main body 110, allowing the lever 121 to rotate relative to the main body 110. In one embodiment, the lever 121 is hingedly affixed to a bottom surface 116 of the panel 111 at a retention portion 122 of the lever 121. The lever 121 extends outward from the hinge 124, such that an actuation portion 123 of the lever 121 extends through the void 115 of the sidewall 112 to be exterior to the main body 110. The main body 110 may include a stop 117 that interacts with the lever 121 to limit the range of motion of the lever 121 relative to the main body 110.

In one embodiment, the lever 121 and the first transportation mechanism 140 are connected, with the first transportation mechanism 140 positioned on the lever 121 to be engageable with a work surface (not shown) under the main body 110. In one embodiment, the first transportation mechanism 140 may consist of one or more wheels, rollers, coasters, skids, or the like.

In one embodiment, the lever 121 is freely hinged to the main body 110 with no bias other than that exerted by the mechanical relationship of the two components. It should be appreciated that due to the force exerted by the mass of the movable support device 100, and any item placed thereon, the lever 121 will be rotated upwards towards the panel 111 and the resistive portion 160 of the main body 110 will be engaged with the work surface. Actuation of the handle assembly 120, such as by pressing with a downward force sufficient to overcome the force exerted by the mass of the support device 100 and any item on it, causes the lever 121 to rotate downwards towards the work surface. The first transportation mechanism 140 is associated with the lever 121 and moves with it such that the first transportation mechanism 140 engages the work surface.

Figure 5A:
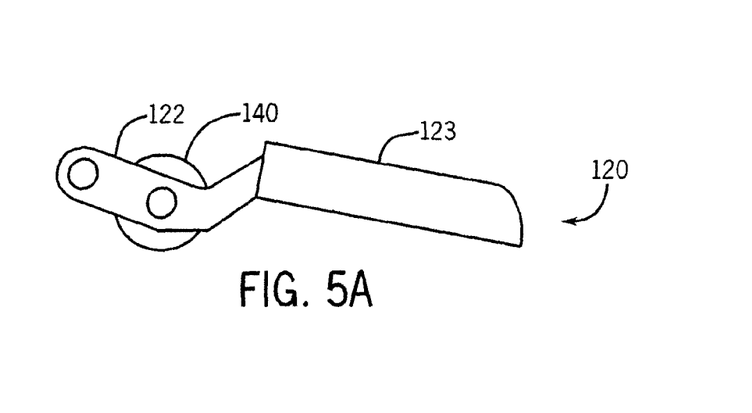
FIG. 5A illustrates a side view of the lever of one embodiment.
Figure 5B:
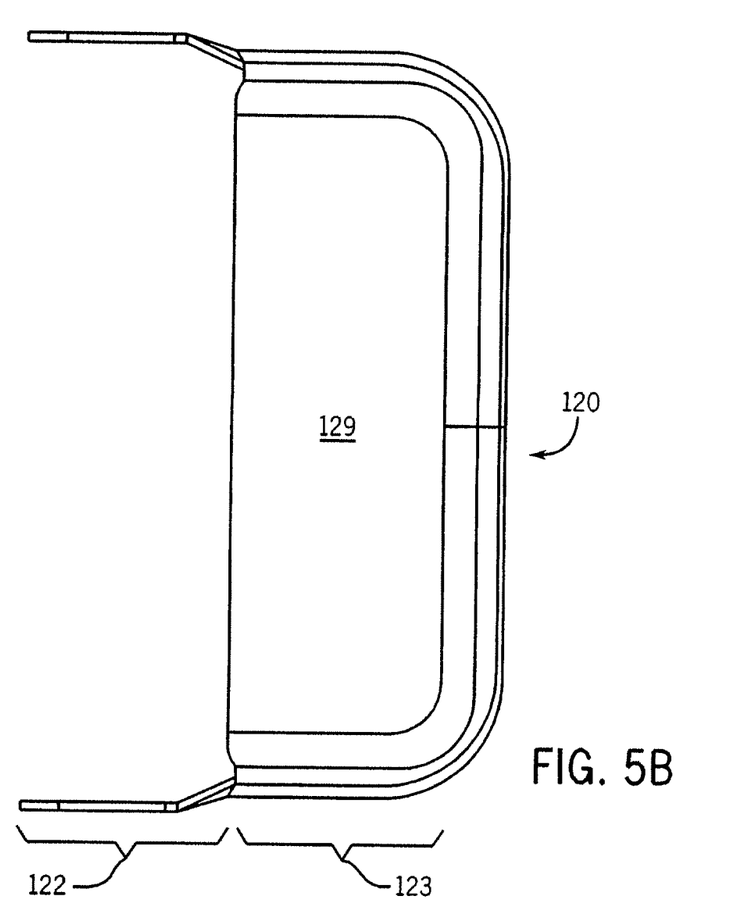
FIG. 5B illustrates a top view of the lever of FIG. 5A.

In one embodiment, as best shown in FIG. 5A, the lever 121 has a shape that positions the first transportation mechanism 140 to contact the work surface upon actuation of the handle assembly 120. For example, as shown in FIG. 5, the lever 121 may have a generally "S"-shaped profile such that the first transportation mechanism 140 will be the closest portion of the handle assembly 120 to the work surface when in the resistive state. It should be appreciated that such a structure ensures that the first transportation mechanism 140 will engage the work surface due to actuation of the handle actuation portion 123 prior to the handle actuation portion 123 itself contacting the work surface and preventing further rotation of the lever 121. In one embodiment, only a slight rotation of the lever 121 is necessary to engage the first transportation mechanism 140 with the work surface.

Figure 2A:
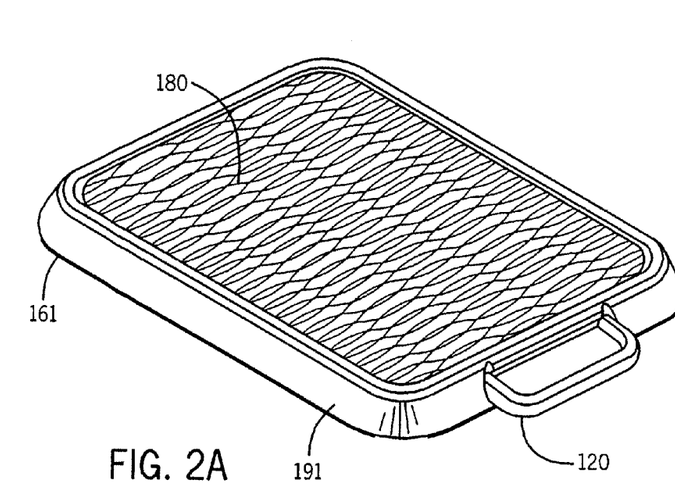
FIG. 2A is a perspective view of the top of the movable support device of claim 1.
Figure 2B:
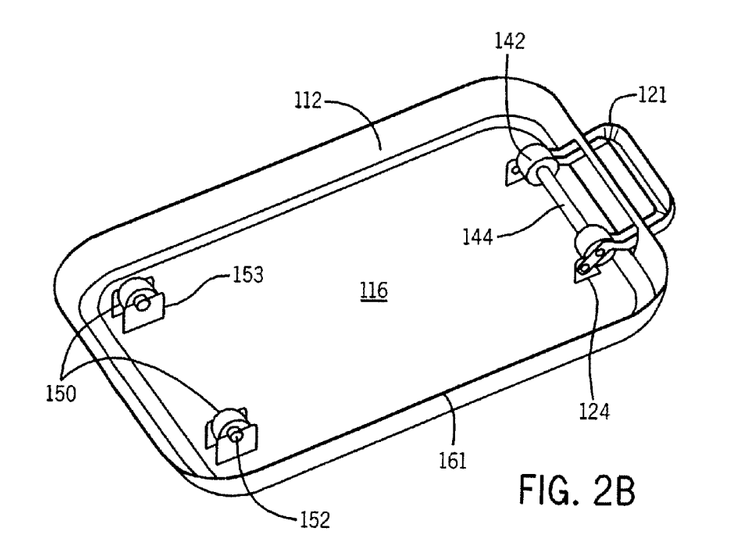
FIG. 2B is a perspective view of the bottom of the movable support device of claim 1.
Figure 2C:
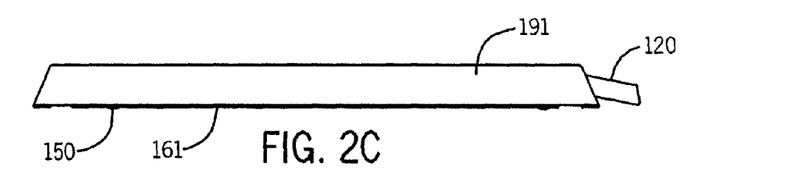
FIG. 2C is a front elevation view of the movable support device of claim 1.
Figure 2D:
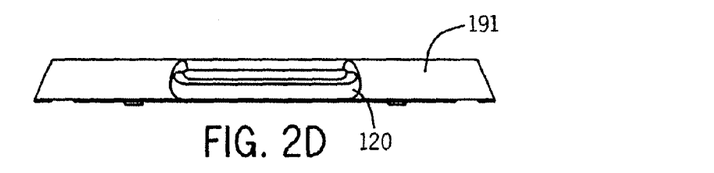
FIG. 2D is a side elevation view of the movable support device of claim 1.

A second transportation mechanism 150 may also be provided to reduce the necessary force exerted in the transportation mode. The second transportation mechanism 150 may be a low-friction portion of the sidewall 112 that is positioned to engage the work surface when in the transportative mode, i.e. when the main body 110 is slightly tilted. In an alternative embodiment, the second transportation mechanism 150 may consists of one or more wheels, rollers, coasters, skids, or the like, which may connected with the main body 110. For example, FIG. 2D illustrates an embodiment wherein the second transportation mechanism 150 comprises a plurality of rollers 151, including roller covers 154, that are positioned on axles 152 engageable with brackets 153 affixed to the bottom surface 116 of the panel 111.

Figure 4A:
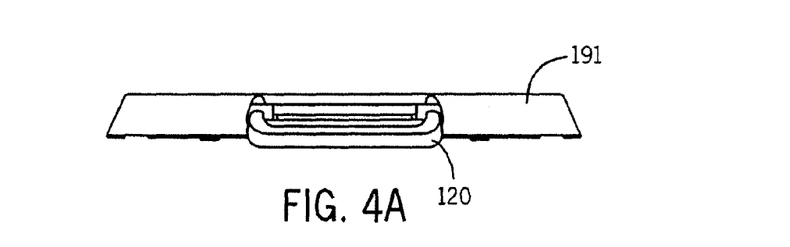
FIG. 4A being a front elevation view.
Figure 4B:
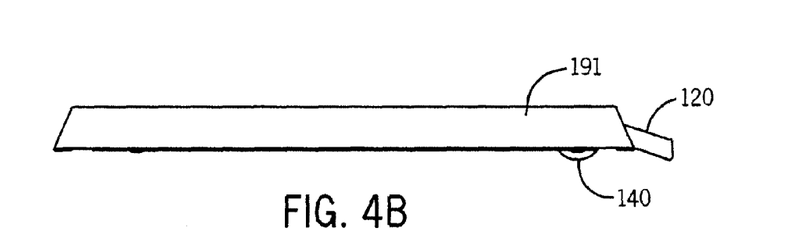
FIG. 4B a side elevation view.
Figure 4C:
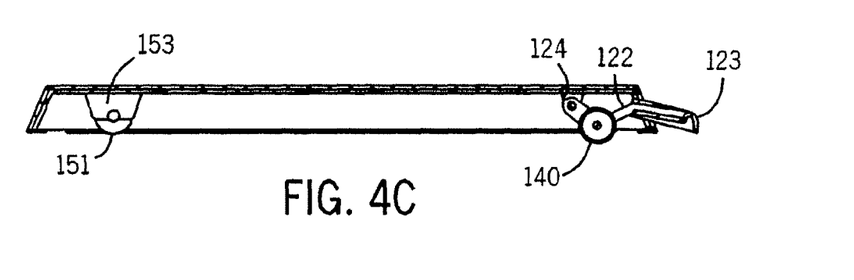
FIG. 4C a cross sectional view along line B-B.

In the embodiment illustrated in FIG. 1, the first transportation mechanism 140 comprises at least one roller 141 consisting of a first roller cover 143 and a first roller 141. It should be appreciated that the at least one roller 141 may comprise two rollers 141 as illustrated in FIG. 1, connected by an axle 144. As can be seen in FIGS. 4A-C, roller 141 is attached to the lever 121. The roller 141 is lowered as the lever 121 is depressed, rotating away from the panel 111 towards the work surface. In the embodiment of FIG. 1, the first transportation mechanism 140 includes the axle 144 affixed to the lever 121.

In one embodiment, a handle cover 129 is provided which is engageable with the lever 121. The handle cover 129 may comprise material selected for its ability to assist a user in gripping the lever 121 or material selected for comfort to a user.

Figure 3A:
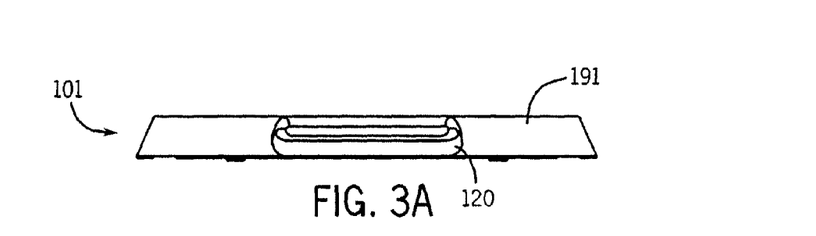
FIG. 3A being a front elevation view.
Figure 3B:
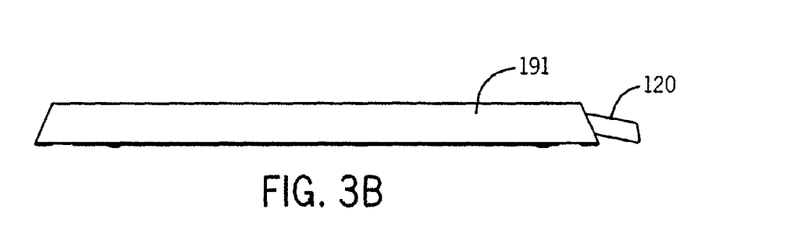
FIG. 3B a side elevation view.
Figure 3C:
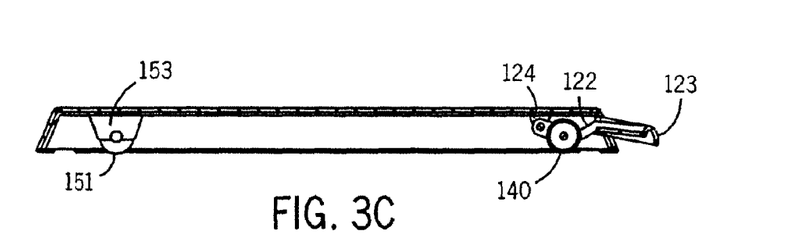
FIG. 3C a cross sectional view along line A-A.

FIGS. 3A-C illustrate the movable support device 100 of FIG. 1 in the resistive position. In the resistive position the handle assembly 120 is rotated towards the panel 111. The weight of the item and the movable support device 100 are sufficient to cause a resistance portion 160 to engage a work surface, such as a countertop or other surface upon which the movable support device 100 rests. For example, friction between a grip ring 161 and the work surface serves to resist movement (forward/backward/right/left) of the movable support device 100.

Turning to FIGS. 4A-C, when the item on the movable support device 100 is to be moved, the handle assembly 120 may be actuated. Actuation of the handle assembly 120 results in movement of the first transportation mechanism 140 away from the main body 110. The first transportation mechanism 140 engages the work surface. The force exerted on the handle assembly 120 acts to push the first transportation mechanism 140 against the work surface, which results in the main body 110 being displaced away from the work surface. This movement of the main body 110 due to the engagement of the transportation mechanism 140 with the work surface is sufficient to reduce the resistance provided by the resistance portion 160, such as by lifting the resistance portion 160 from the work surface. This reduction of resistance allows the movable support device 100 to be transported. In one embodiment, the force exerted on the handle assembly 120 is such that the force vectors both are sufficient to engage the first transportation mechanism 140 with the work surface and to move the movable support device 100, such as where a user pushes or pulls the caddy into the desired location. When the handle mechanism 120 is released, the first transportation mechanism 140 disengages from the work surface and the main body 110 approaches the work surface such that the resistance portion engages the work surface.

In one embodiment, the movable support device provides a resistive mode and a transportive mode. In the resistive mode, the engagement of the resistance portion 160 to the work surface provides resistance against movement of the movable support device 100. In the transportive mode, the engagement of the first transportation mechanism 140 with the work surface reduces the resistance of the movable support device in at least one direction. Thus, in one embodiment, the movable support device 100 may be used with a variety of small appliances or other items that need to be stored under the upper cabinets and pulled out for access including coffee makers, toasters, blenders, bread boxes and the like. One of ordinary skill will appreciate that the movable support device 100 stays securely in place when the handle assembly 120 is not depressed. In this way the appliance will not move if accidentally bumped or, in the case of a coffee maker, it will not substantially move when the carafe is removed from the coffee maker. Further, when the movable support device 100 is moved, the first and second transportation mechanisms 140, 150 enable a smooth motion so that items will not spill or tip over in transit.

In one embodiment, the movable support device includes features for retaining the item placed on the device 100. As shown in FIG. 1, the main body 110 may include a top surface 114 which is recessed in relation to the sidewall 112, so that the sidewall 112 essentially forms a lip 113 or ridge about the top surface 114, which at least partially retains an item placed on the support device 100. Further, the top surface 114 may be of a material that aids in retaining the item placed on the support device 100. For example, the top surface 114 may include a pattern or features which engage the item or may comprise a material that exhibits a high degree of friction, e.g. a nonskid surface such as a thermoplastic elastomer. In one embodiment, a nonskid panel 180 may be provided for placement on the top surface 114. FIG. 1 illustrates such an embodiment. The nonskid panel 180 is disposed on the top surface 114 within the recess device by the top surface 114 and the lip 113 of the sidewall 112. The nonskid panel 180 may be physically affixed to the top surface such as via sonic welding, rivets, adhesive, clips, or the like. It may be desirable to be able to easily clean the nonskid panel 180. Therefore, in one embodiment illustrated in FIG. 1, the nonskid panel 180 is removably retained on the main body 110 by a cover 190. The cover 190 includes a sidewall 191 defining an opening through which the nonskid panel 180 is accessible when the cover 190 is placed on the main body 110. The cover 190 may be substantially the same shape, including providing a void 192 corresponding to the main body void 115, such that the cover 190 substantially covers the sidewall 112 of the main body 110. The cover 190 may be in a snap-fit arrangement with the sidewall 112 of the main body 110.

Figure 6A:
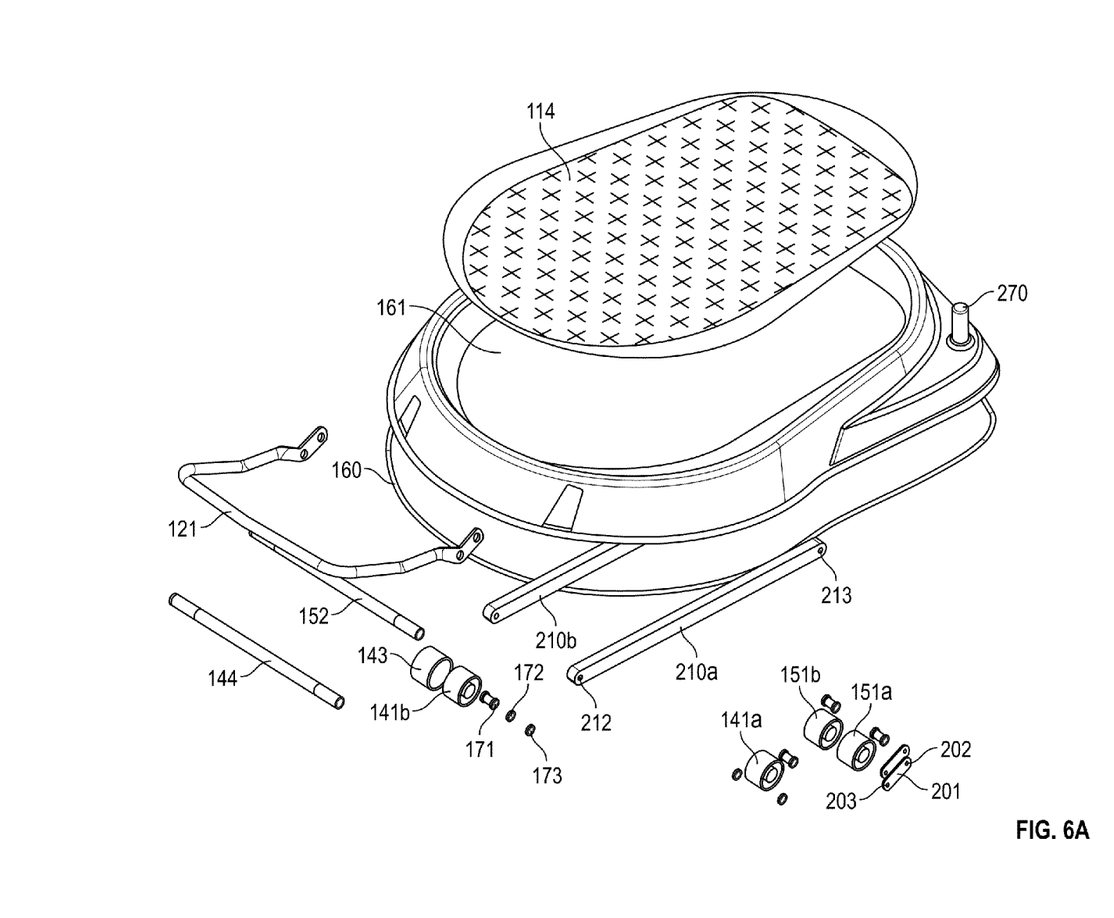
FIG. 6A is an exploded view of an embodiment having a displaceable second transportation mechanism.

In an alternative embodiment, shown in FIG. 6A as an exploded view, the support device includes a displaceable second transportation mechanism 150. Rather than having the second transportation mechanism 150 directly engaged to the body, a connecting portion 201 is attached to the body 110 at one end 202 and to the second transportation mechanism 150 at the other end 203. The second transportation mechanism 150 is also attached to a connecting rod 210 that extends from the first transportation mechanism to the second transportation mechanism 150. A first end 212 of the connecting rod 210 is connected to the first transportation mechanism and a second end 213 of the connecting rod 210 is connected to the second transportation mechanism 150. The connecting rod 203 is a solid component linking the relative position of the first transportation mechanism 140 and the second transportation mechanism 150. In one embodiment, the second transportation mechanism 150 includes the axle 152 and the second end 203 of the connecting portion 201 and the second end 213 of the connecting rod 210 are connected to a roller 151 of the second transportation mechanism 150 at the axle 152. In one embodiment, the first transportation mechanism 140 and the second transportation mechanism 150 each comprise a plurality of rollers 141, 151 (illustrated as a pair). For an embodiment having a pair of rollers each for the transportation mechanisms 140, 150, such as illustrated in FIGS. 6A-D, a respective right side roller 141a of the first transportation mechanism 140 is linked to a respective right side roller 151a of the second transportation mechanism 150 a right side connecting rod 210a. A respective left side roller 141b of the first transportation mechanism 140 is linked to a respective left side roller 151b of the second transportation mechanism 150 a left side connecting rod 210b. In an alternative embodiment, the connecting rod 310 may be connected to other components of the handle assembly 120, for example the lever 121, rather than directly to the first transportation mechanism.

The connecting rod 210 transfers motion of the first transportation mechanism 140, imparted, for example, by actuation of the lever 121, to the second transportation mechanism 150. The connecting portion 201 facilitates a movement of the second transportation portion 150 away from the main body 120. Thus, actuation of the lever 121 to lower the first transportation mechanism 140 to engage the surface also lowers the second transportation mechanism and engages the surface.

Figure 6B:
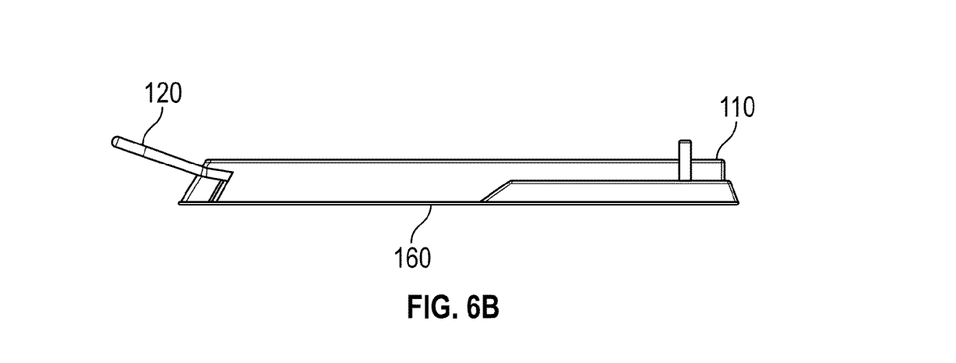
FIG. 6B illustrates the device of FIG. 6A in the resistive mode where neither the first or second transportation mechanism are engaged.
Figure 6C:
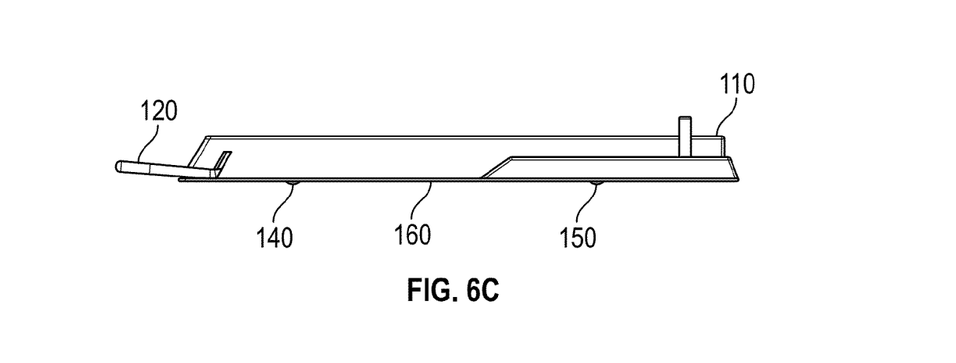
FIG. 6C illustrates a transportive mode where both the first and second transportation mechanisms are engaged.
Figure 6D:
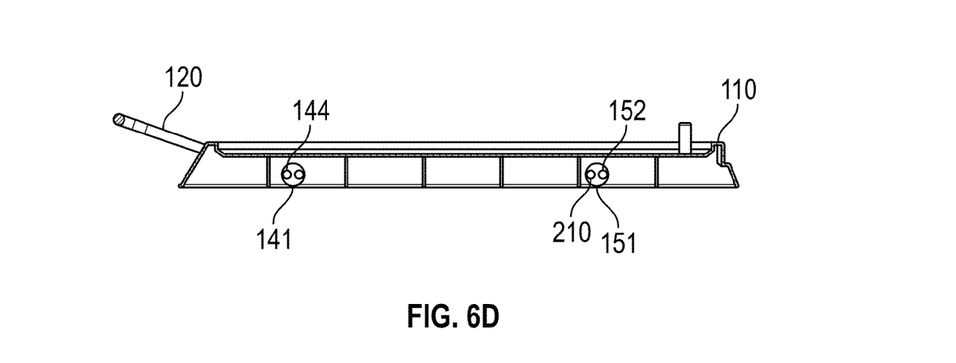
FIG. 6D illustrates a cross-section of FIG. 6B along A-A.

In the illustrated embodiment, the resistive portion 160 is in full contact with the surface and neither the first transportation mechanism or the second transportation mechanism 150 is engaged, that is not support the weight of the main body. FIG. 6B illustrates the device of FIG. 6A in the resistive mode where neither the first or second transportation mechanism are engaged. As can be seen, the main body 110 rests on the surface. The main body is not supported by either the first transportation mechanism or the second transportation mechanism. The resistive portion engages the surface to resist movement of the support device. In contrast, FIG. 6C illustrates a transportive mode where both the first and second transportation mechanisms are engaged. The rollers 141, 151 of the first and second transportation mechanisms can be seen supporting the main body 110. This transportive mode allows the device to be moved via the rollers 141, 151. FIG. 6D illustrates a cross-section of FIG. 6B along A-A.

FIG. 6A also illustrates a mechanism for securing the rollers 141, 151 to the axles 144, 152. A pin 171 in combination with snap rings 172 and 173 may be used.

Figure 7A:
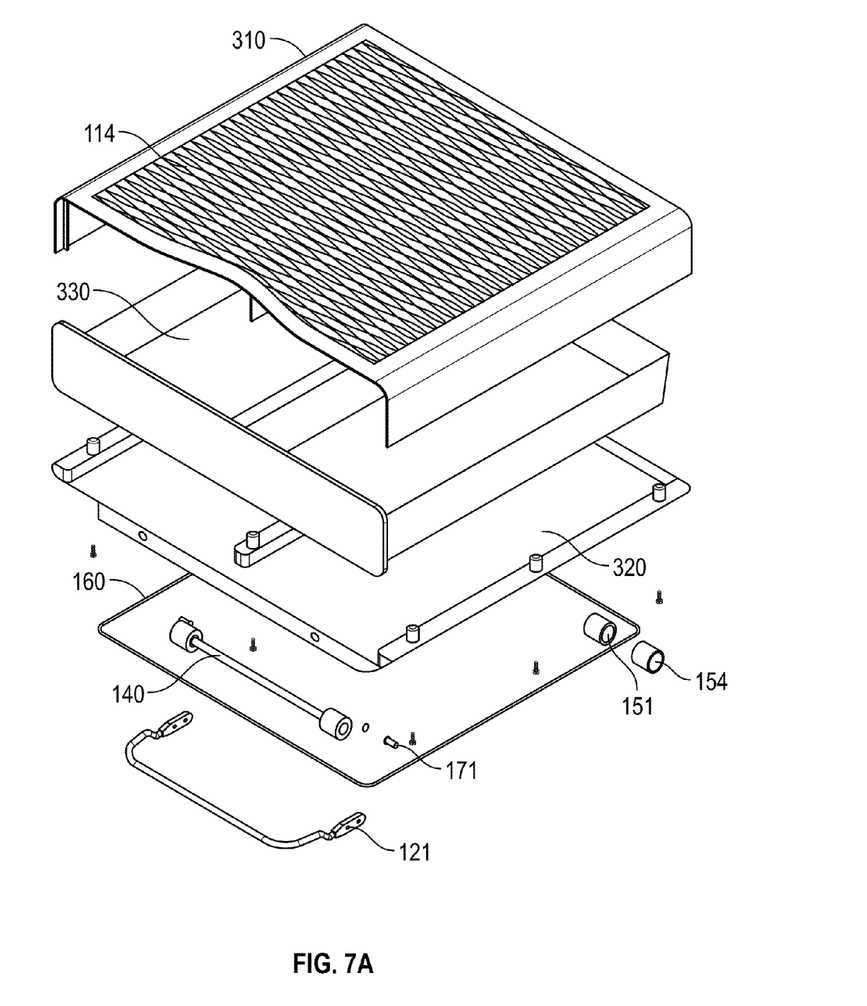
FIG. 7A-B illustrate an embodiment having a drawer mechanism.
Figure 7B:
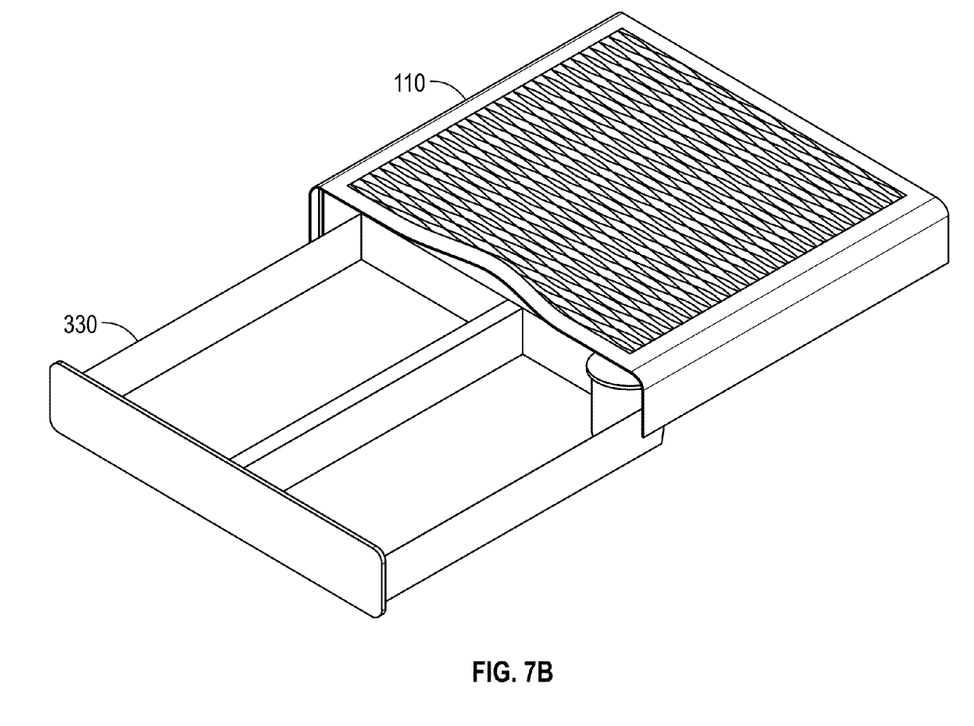

FIG. 7A-B illustrate an embodiment having a drawer mechanism 300. In the illustrated embodiment, the drawer mechanism 300 is provided as part of the main body 110. The main body 110 includes a main body top 310 that may have the top surface 114 thereon. The main body top 310 is engageable with a main body bottom 320. The main body bottom 320 incldues the bottom surface 117 and the resistive portion 160. In the illustrated embodiment, the a void 115 in the main body bottom 320 is provided for the handle assembly 120 to extend for actuation of the lever 121. The first and second transportation mechanisms 140, 150 are engaged with the main body bottom 320. The main body top 310 and main body bottom 320 form chamber 302 therebetween, such as by side portions 311 of the main body top 310 spacing the top surface 114 from the main body bottom portion 320. The side portions 311 may be a part of the main body top 310 or the main body bottom 320 or separate components engageable with both the top 310 and the bottom 320. One or more inserts or drawers 330 are removably engageable with the chamber 302. Draw guide mechanisms such as known in the art may be utilized.

Figure 8:
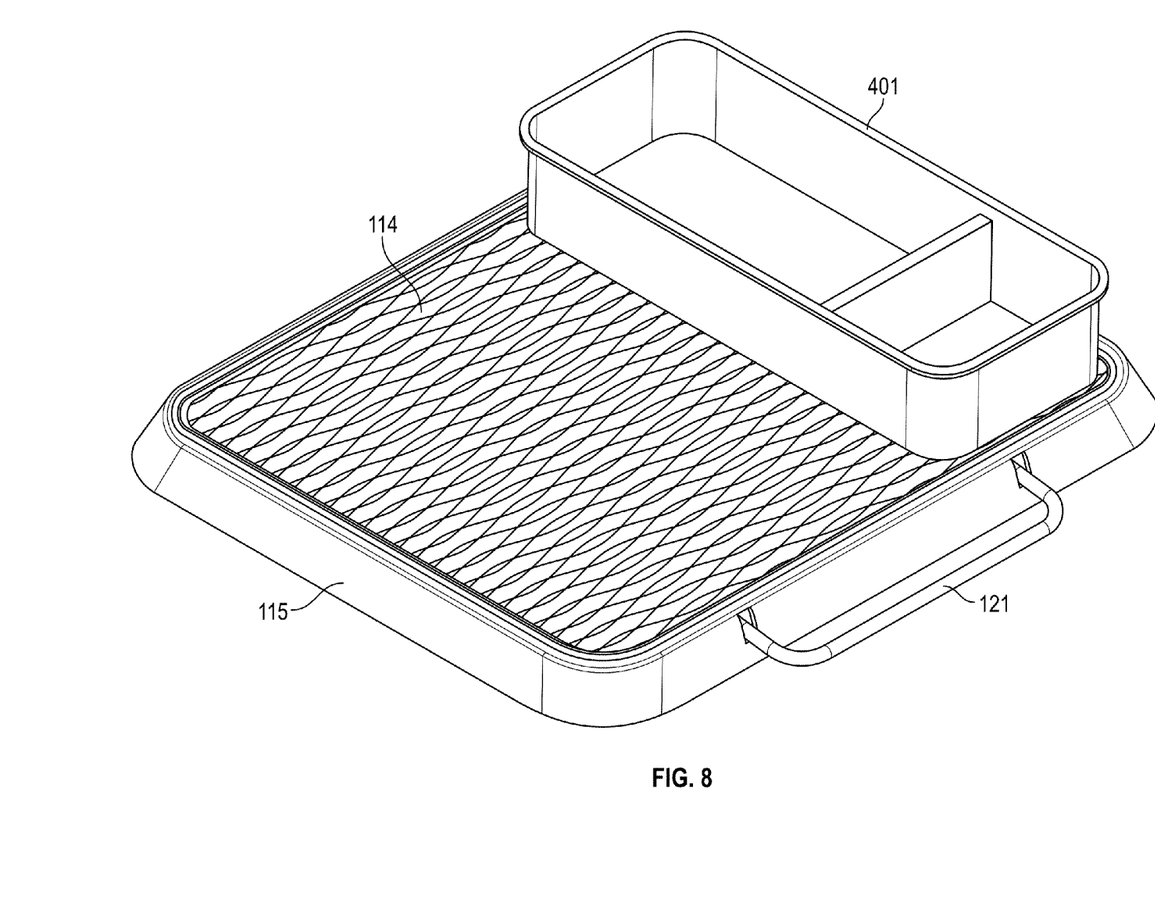
FIG. 8 illustrates an embodiment with a storage bin.

FIG. 8 illustrates an embodiment with a storage bin 401. In the illustrated embodiment, the main body 110 may be configured to receive a bin 401.

In one embodiment, the main body may be configured to receive various machines. For example, the illustrated embodiment of FIG. 6A includes a retention post 270. The retention post is configured to engage a corresponding feature of a stand-mixer type machine to secure the machine to the device 100.

While the invention has been described in terms of exemplary embodiments, those skilled in the art will recognize that the invention can be practiced with modifications in the spirit and scope of the appended claims. These examples given above are merely illustrative and are not meant to be an exhaustive list of all possible designs, embodiments, applications, or modifications of the invention.

What is claimed is:

1. A support device comprising:
    a main body;
    a resistance portion attached to the main body and configured to resist movement of the main body in at least one direction when in contact with a surface;
    a handle assembly partially disposed within the main body, the handle assembly comprising a lever and a first transportation mechanism, the lever having a first portion substantially interior to the main body and hingedly attached to the main body and a second portion substantially exterior to the main body;
    a second transportation mechanism hingedly attached to the main body by a connection portion;
    a connecting rod connecting the first transportation mechanism to the second transportation mechanism;
    the first transportation mechanism connected to the handle assembly;
    the first transportation mechanism comprising a first roller and a second roller and the second transportation mechanism comprising a first roller and a second roller and the connecting rod comprises a first connecting rod, further wherein the first roller of the first transportation mechanism is connected via the first connecting rod to the first roller of the second transportation mechanism, wherein the connecting rod comprises the first connecting rod and a second connecting rod, further wherein the second roller of the first transportation mechanism is connected via the second connecting rod to the second roller of the second transportation mechanism;
    the first transportation mechanism and the second transportation mechanism movable relative to the main body and the surface;
    wherein the resistance portion of the main body is in contact with the surface in a resistive mode and movement of the handle assembly to pivot away from the main body engages the first transportation mechanism and the second transportation mechanism with the surface and moving at least a portion of the resistance portion away from the surface in a transportive mode.

2. The support device of claim 1, wherein the main body includes a panel and a sidewall which includes the resistance portion.

3. The support device of claim 1, wherein the sidewall comprises a void and further wherein the lever passes through the void in the sidewall.

4. The support device of claim 1, wherein the first transportation mechanism comprises an axle that is affixed to the lever.

5. The support device of claim 4, wherein the lever has a profile that is generally S-shaped such that an interior portion of the lever curves in a first direction and the exterior portion curves in a second direction and the axle is affixed at a location on the lever substantially closest to the surface when in the resistive mode.

6. The support device of claim 1, wherein the main body comprises a main body bottom and a main body top defining a chamber therebetween.

7. The support device of claim 6, further comprising a drawer engageable with the main body and substantially disposable within the chamber.

8. The support device of claim 2, wherein the lever is hingedly attached to a bottom side of the panel and the first transportation mechanism is interior to the main body.

9. A support device comprising
    a main body having a resistance portion for engaging a surface to resist movement of the support device;
    a handle assembly hingedly attached at a first end to a bottom surface of the main body and extending through a void in the main body;
    the handle assembly further having a first transportation mechanism attached to the handle assembly between the hinged attachment and the void, the handle assembly movable within the void to rotate relative to the main body between a first position and a second position;
    a second transportation mechanism attached to the main body by a connection portion;
    a connecting rod connecting the handle assembly to the second transportation mechanism;
    wherein when the handle assembly is in the first position, the first transportation mechanism and the second transportation mechanism are disposed within main body and when the handle assembly is in the second position, the first transportation mechanism and the second transportation mechanism are at least partially outside of the main body, such that the first transportation mechanism extends below a plane defined by the resistance portion.

10. The support device of claim 9, wherein the main body includes a panel and a sidewall which includes the resistance portion.

11. The support device of claim 9, wherein the sidewall comprises the void and further wherein the lever passes through the void in the sidewall.

12. The support device of claim 9, wherein the first transportation mechanism comprises a first roller and a second roller and the second transportation mechanism comprises a first roller and a second roller and the connecting rod comprises a first connecting rod, further wherein the first roller of the first transportation mechanism is connected via the first connecting rod to the first roller of the second transportation mechanism.

13. The support device of claim 12, wherein the connecting rod comprises the first connecting rod and a second connecting rod, further wherein the second roller of the first transportation mechanism is connected via the second connecting rod to the second roller of the second transportation mechanism.

14. The support device of claim 9, wherein the first transportation mechanism comprises an axle that is affixed to the lever.

15. The support device of claim 14, wherein the lever has a profile that is generally S-shaped such that an interior portion of the lever curves in a first direction and the exterior portion curves in a second direction and the axle is affixed at a location on the lever substantially closest to the surface when in the resistive mode.

16. The support device of claim 9, wherein the main body comprises a main body bottom and a main body top defining a chamber therebetween.

17. The support device of claim 16, further comprising a drawer engageable with the main body and substantially disposable within the chamber.

18. The support device of claim 9, further comprising a bin engaged with the main body.

19. A support device comprising:
a main body;
a resistance portion attached to the main body and configured to resist movement of the main body in at least one direction when in contact with a surface;
a handle assembly partially disposed within the main body, the handle assembly comprising a lever and a first transportation mechanism, the first transportation mechanism comprises an axle that is affixed to the lever, the lever having a first portion substantially interior to the main body and hingedly attached to the main body and a second portion substantially exterior to the main body;
a second transportation mechanism hingedly attached to the main body by a connection portion;
a connecting rod connecting the first transportation mechanism to the second transportation mechanism;
the first transportation mechanism connected to the handle assembly;
the first transportation mechanism and the second transportation mechanism movable relative to the main body and the surface;
wherein the resistance portion of the main body is in contact with the surface in a resistive mode and movement of the handle assembly to pivot away from the main body engages the first transportation mechanism and the second transportation mechanism with the surface and moving at least a portion of the resistance portion away from the surface in a transportive mode.

20. The support device of claim 19, wherein the lever has a profile that is generally S-shaped such that an interior portion of the lever curves in a first direction and the exterior portion curves in a second direction and the axle is affixed at a location on the lever substantially closest to the surface when in the resistive mode.

* * * * *